United States Patent
Montanya Silvestre

(10) Patent No.: US 7,446,300 B2
(45) Date of Patent: Nov. 4, 2008

(54) MINIATURE ELECTRO-OPTIC DEVICE HAVING A CONDUCTIVE ELEMENT FOR MODIFYING THE STATE OF PASSAGE OF LIGHT BETWEEN INLET/OUTLET POINTS AND CORRESPONDING USES THEREOF

(75) Inventor: Josep Montanya Silvestre, Rubi (ES)

(73) Assignee: Baolab Microsystems, S. L., Barcelona (ES)

( * ) Notice: Subject to any disclaimer, the term of this patent is extended or adjusted under 35 U.S.C. 154(b) by 743 days.

(21) Appl. No.: 10/534,745

(22) PCT Filed: Nov. 18, 2003

(86) PCT No.: PCT/ES03/00584

§ 371 (c)(1),
(2), (4) Date: May 12, 2005

(87) PCT Pub. No.: WO2004/046807

PCT Pub. Date: Jun. 3, 2004

(65) Prior Publication Data

US 2006/0152739 A1    Jul. 13, 2006

(30) Foreign Application Priority Data

Nov. 19, 2002  (ES) ................. 200202792

(51) Int. Cl.
  *H01J 40/14*  (2006.01)
(52) U.S. Cl. ....................... 250/221; 250/239
(58) Field of Classification Search ........... 250/221, 250/239, 559.26, 559.24, 559.29, 227.11, 250/234; 359/239, 291; 200/61.02, 43.09, 200/43.05

See application file for complete search history.

(56) References Cited

U.S. PATENT DOCUMENTS 2,218,502 A * 10/1940 Breitenstein ............... 236/69
6,143,997 A    11/2000 Feng et al.
2002/0140533 A1  10/2002 Miyazaki et al.

FOREIGN PATENT DOCUMENTS

| EP | 1093142 | 4/2001 |
| EP | 1093143 | 4/2001 |
| WO | WO 01/06543 | 1/2001 |

OTHER PUBLICATIONS

International Search Report for corresponding PCT/ES2003/000584 mailed Feb. 6, 2004.
U.S. Appl. No. 10/534,736, filed May 12, 2005, Josep Montanyà Silvestre, Baolab Microsystems S.L.

* cited by examiner

*Primary Examiner*—Que T Le
(74) *Attorney, Agent, or Firm*—Staas & Halsey LLP

(57) ABSTRACT

A miniaturized electro-optical device having a first zone facing a second zone, a first condenser plate, a second condenser plate arranged in the second zone and smaller than or equal to the first condenser plate, an intermediate space between both zones, with a conductive element arranged therein and which is independent from the side walls and moves thereacross the space depending on voltages present across both plates, two inlet/outlet points for light of an optical circuit, where the conductive element modifies the state of passage of light between the inlet/outlet points, when it is in contact with the stop. The device can be used, for example, as an accelerometer, a tiltmeter, a Coriolis force detector, a microphone, for acoustic applications, for the manufacture of an optical switching matrix, for the projection of images or as a pressure flowrate, temperature, gas, sensor.

27 Claims, 15 Drawing Sheets

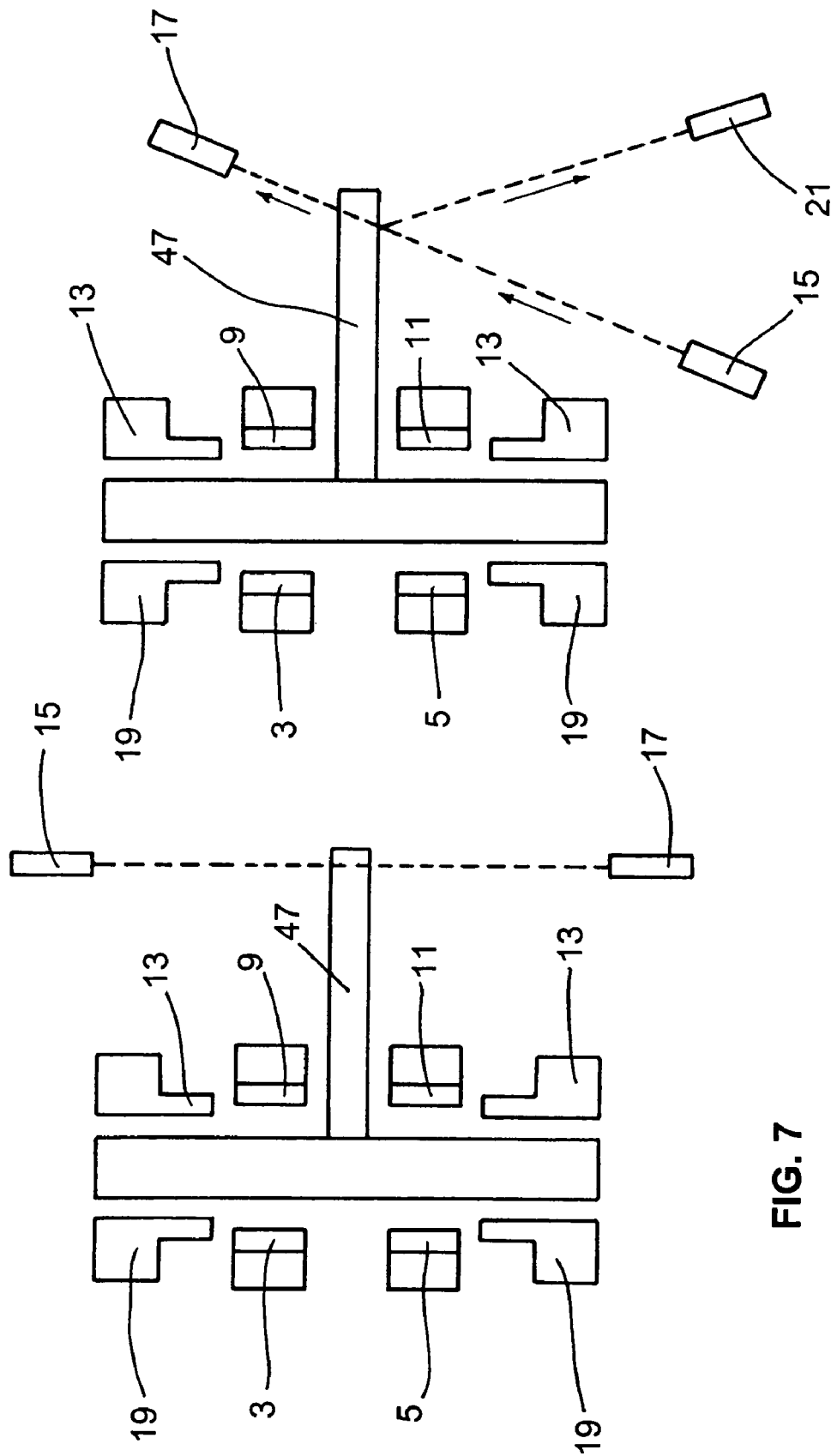

US 7,446,300 B2

MINIATURE ELECTRO-OPTIC DEVICE HAVING A CONDUCTIVE ELEMENT FOR MODIFYING THE STATE OF PASSAGE OF LIGHT BETWEEN INLET/OUTLET POINTS AND CORRESPONDING USES THEREOF

FIELD OF THE INVENTION

This invention relates to a miniaturised electro-optical device. The invention also relates to different uses for miniaturised electro-optical devices according to the invention.

STATE OF THE ART

All kinds of electro-optical devices and systems are known, used mainly (but not exclusively) in information transmission technology.

On the other hand, also known is the production of miniaturised electro-optical devices in the context of technologies known as MEMS technology (micro electromechanical systems), Microsystems and/or Micromachines. These miniaturised devices are usually electromechanical devices fulfilling functions similar to electromechanical devices of conventional size, such as for example, relays, various types of sensors, pumps, etc. The object of the invention is to provide electro-optical type miniaturised devices, namely, those in which starting out from an electrical signal it is possible to interact in an optical signal.

It is in particular an object of the present invention to provide a miniaturised electro-optical device allowing the state of light passage through an optical circuit to be modified, that is, by exerting a function equivalent to an electrical relay, with which it will have in common several electrical and mechanical components. There are currently several alternatives for producing miniaturised relays. In principal they may be classified according to the type of force or actuation mechanism they use to move the contact electrode. Thus they are usually classified as electrostatic, magnetic, thermal and piezoelectric relays. Each one has its advantages and its drawbacks. However miniaturisation techniques require the use of the smallest possible activation voltages and the smallest possible surfaces. The relays known in the state of the art have several problems impeding their advance in this respect.

A manner of reducing the activation voltage is precisely to increase the relay surface areas, which renders miniaturisation difficult, apart from being conducive to the appearance of deformations reducing the useful life and reliability of the relay. In electrostatic relays, another solution for decreasing the activation voltage is to greatly reduce the space between the electrodes, or use very thin electrodes or special materials, so that the mechanical recovery force is very low. However this implies problems of sticking, since capillary forces are very high, which thus also reduces the useful working life and reliability of these relays. The use of high activation voltages also has negative effects such as ionisation of the components, accelerated wearing due to strong mechanical solicitation and the electric noise which the whole relay generates.

Electrostatic relays also have a significant problem as to reliability, due to the phenomenon known as "pull-in", and which consists in that, once a given threshold has been passed, the contact electrode moves with increasing acceleration against the other free electrode. This is due to the fact that as the relay closes, the condenser which exerts the electrostatic force for closing greatly increases its capacity (and would increase to infinity if a stop were not imposed beforehand). Consequently there is a significant wear on the electrodes due to the high electric field which is generated and the shock caused by the acceleration to which the moving electrode has been exposed.

The thermal, magnetic and piezoelectric approaches require special materials and micromachining processes, and thus integration in more complex MEMS devices, or in one same integrated with electronic circuitry is difficult and/or costly. Additionally the thermal approach is very slow (which is to say that the circuit has a long opening or closing time) and uses a great deal of power. The magnetic approach generates electromagnetic noise, which renders having close electronic circuitry much more difficult, and requires high peak currents for switching.

In general, relays have a moving member by which at least one external electric circuit may be opened and closed, in which at least one of the external electric circuit opening and closing actions is performed by means of an electromagnetic signal, the reactive force being spring-like in nature. The electro-optical device of the present invention likewise requires the movement of a moving member to be able to interact with the optical circuit. In this respect it shares in part the problems and drawbacks of the above mentioned electrical relays.

SUMMARY OF THE INVENTION

The object of the invention is to provide a miniaturised electro-optical device such as the abovementioned. This is achieved by means of a miniaturised electro-optical device characterised in that it comprises:
a first zone facing a second zone,
a first condenser plate,
a second condenser plate arranged in the second zone, in which the second condenser plate is smaller than or equal to the first condenser plate,
an intermediate space arranged between the first zone and the second zone,
a conductive element arranged in the intermediate space, where the conductive element is mechanically independent of the first zone and the second zone and is suitable for performing a movement across the intermediate space dependant on voltages present in the first and second condenser plates,
a first inlet/outlet point of light from an optical circuit, a second inlet/outlet point of the optical circuit, arranged in such a way as to allow the passage of light therebetween,
at least one stop, where the conductive element is suitable for contacting the first stop, where the conductive element modifies the state of passage of light between the first inlet/outlet point and the second inlet/outlet point when it is in contact with the first stop.

In fact the electro-optical device according to the invention has the conductive element, which is to say the element responsible for opening and closing the passage of light from the external optical circuit (through the first inlet/outlet point (hereinafter abbreviated as I/O) and the second I/O point), as a loose part capable of moving freely. I.e. the elastic force of the material is not being used to force one of the electro-optical device movements. This allows a plurality of different solutions, all benefiting from the advantage of needing very low activation voltages and allowing very small design sizes. The conductive element is housed in the intermediate space. The intermediate space is closed by the first and second zone and by side walls which prevent the conductive element from leaving the intermediate space. When voltage is applied to the first and second condenser plates charge distributions are induced in the conductive element which generate electrostatic forces which in turn move the conductive element in one direction along the intermediate space. By means of different designs to be described in detail below this effect can be used in several different ways.

Additionally, an electro-optical device according to the invention likewise satisfactorily resolves the previously mentioned problem of "pull-in".

The first I/O point and the second I/O point may be separated from one another at a distance as large as the pertinent optical circuit technology allows. From the point of view of the invention, it is only necessary for the electro-optical device to interfere with the beam of light being propagated from the first I/O point to the second I/O point. In this sense, both I/O points may be integrated physically in the walls surrounding the conductive element, but they may also be physically separated from the walls surrounding the conductive member of the optical circuit and may be physically independent parts. In this sense, the electro-optical device has to be understood as a functional assembly of members, although physically these members are separate. Additionally, it should be understood that the I/O point is simply an orifice though which the light may be propagated. The optical fibre or, in general, the device used for propagating the light to the I/O point must not be deemed to form part of the electro-optical device.

In general, the conductive element will have part of the surface thereof fulfilling the function of optical actuation surface. In certain cases this surface will be a shutter surface, where the basic function will be to prevent the light beam from reaching the corresponding I/O point. In other cases, this surface will be a reflective surface, where the basic function will be to deflect the light beam by reflection, in a particular direction.

Another additional advantage of the electro-optical device according to the invention is the following: in conventional electrostatic relays, if the conductive element sticks in a given position (which depends to a great extent, among other factors, on the humidity) there is no possible manner of unsticking it (except by external means, such as for example drying it) since due to the fact that the recovery force is elastic, it is always the same (depending only on the position) and cannot be increased. On the contrary, if the conductive element sticks in an electro-optical device according to the invention, it will always be possible to release it by increasing the voltage.

Depending on the geometry of the intermediate space and the positioning of the condenser plates, several different types of electro-optical devices, with various applications and functioning modes may be achieved.

For example, the conductive element may move in different ways:
   a first possibility is that the conductive element may move along the intermediate space with a translational movement, i.e., in a substantially rectilinear manner (excluding of course possible shocks or oscillations and/or movements provoked by unplanned and undesired external forces) between the first and second zones.
   a second possibility is that the conductive element move along the intermediate space with a movement that combines a translational movement between the first and second zones, induced by the electrostatic forces generated, and a movement that is perpendicular to the former, induced by a Coriolis force. This solution will be described in greater detail below.

A preferred embodiment is achieved when the first condenser plate is in the second zone. Alternatively the electro-optical device can be designed so that the first condenser plate is in the first zone. In the first case an electro-optical device is obtained which has a lower activation voltage and which is faster. On the other hand, in the second case the electro-optical device is slower, which means that the shocks experienced by the conductive element and the stops are gentler, and energy consumption is lower. In this way, one can choose between one and the other alternative depending on the specific requirements in each case.

When the conductive element is in contact with the first stops, which is to say with when it is interacting with the optical circuit, the conductive element may be moved with different types of forces, to be detailed hereinafter. To return the conductive element to the first stops, it is sufficient to apply voltage across the first and second condenser plates. This causes the conductive element to be attracted toward the second zone, modifying once again the state of passage of light between the first and second I/O points.

Should the first condenser plate be in the first zone and the second condenser plate in the second zone, a manner of achieving the necessary force to move the conductive element mentioned in the foregoing paragraph consists of the addition of a third condenser plate arranged in the second zone, where the third condenser plate is smaller than or equal to the first condenser plate and where the second and third condenser plates are, together, larger than the first condenser plate. With this arrangement the first condenser plate is to one side of the intermediate space and the second and third condenser plates are to the other side of the intermediate space and close to one another. In this manner one can force the movement of the conductive element in both directions by means of electrostatic forces.

Another preferred embodiment of the invention is achieved when the electro-optical device additionally comprises a third condenser plate arranged in said second zone and a fourth condenser plate arranged in said first zone, in which said first condenser plate and said second condenser plate are equal to each other, and said third condenser plate and said fourth condenser plate are equal to one another. In fact, in this manner, if one wishes the conductive element to travel towards the second zone, one can apply voltage to the first and fourth condenser plates, on the one hand, and to the second or to the third condenser plates, on the other hand. Given that the conductive element will move toward the place in which is located the smallest condenser plate, it will move toward the second zone. Likewise one can obtain movement of the conductive element toward the first zone by applying a voltage to the second and third condenser plates and to the first or the fourth condenser plates. The advantage of this solution, over the simpler three condenser plate solution, is that it is totally symmetrical, which is to say that it achieves exactly the same electro-optical device behaviour irrespective of whether the conductive element moves toward the second zone or the first zone. Advantageously the first, second, third and fourth condenser plates are all equal with respect to one another, since generally it is convenient that in its design the electro-optical device be symmetrical in several respects. On one hand there is symmetry between the first and second zone, as commented above. On the other hand it is necessary to retain other types of symmetry to avoid other problems, such as for example the problems of rotation or swinging in the conductive element and which will be commented upon below. In this respect it is particularly advantageous that the electro-optical device comprise, additionally, a fifth condenser plate arranged in the first zone and a sixth condenser plate arranged in the second zone, in which the fifth condenser plate and the sixth condenser plate are equal to each other. On one hand increasing the number of condenser plates has the advantage of better compensating manufacturing dispersions. On the other, the several different plates can be activated independently, both from the point of view of voltage applied and of activation time. The six condenser plates can all be equal to each other, or alternatively the three plates on one same side can have different sizes with respect to one another. This allows minimising activation voltages. An electro-optical device which has three or more condenser plates in each zone allows all the following objectives to be achieved:

it can function in both directions symmetrically, it has a design which allows a minimum activation voltage for fixed overall electro-optical device dimensions, it allows minimisation of current and power consumption, and also a smoother electro-optical device functioning, it allows a design of the condenser plates with central symmetry or asymmetry relative to the centre of masses, such that the resulting moment exerted on the free conductor will be null or not null depending on the needs of each particular case.

In general, increasing the number of condenser plates in each zone allows for greater flexibility and versatility in the design, at the same time as it allows the effect of the dispersions proper to manufacture to be reduced, since the dispersions of each of the plates will tend to be compensated by the dispersions of the remaining plates.

Advantageously the electro-optical device comprises a second stop (or as many second stops as there are first stops) between the first zone and the conductive element. In this manner one also achieves a geometric symmetry between the first zone and the second zone. When the conductive element moves toward the second zone, it can do so until entering into contact with the first stops, and will modify the state of passage of light between the I/O points. When the conductive element moves toward the first zone it can do so until entering into contact with the second stop(s). In this manner the movement performed by the conductive element is symmetrical.

An advantageous variation of the above case is achieved when the electro-optical device comprises a third I/O point and a fourth I/O point arranged between the first zone and the conductive element, such that the conductive element modifies the state of passage of light of a second optical circuit when in contact with the second stop or stops. In fact, in this case the electro-optical device may connect two electric circuits alternately.

Advantageously, each of the assemblies of condenser plate arranged in each of the first zone and second zone has a central symmetry relative to a centre of symmetry, where said centre of symmetry is superimposed on the centre of masses of the conductive element. In fact, each assembly of the condenser plates arranged in each of the zones generates a force field on the conductive element. If the resultant of this force field has a non nil moment relative to the centre of masses of the conductive element, the conductive element not only translates, but additionally undergoes rotation around the centre of masses thereof. In this sense, it is desirable to contemplate that the plate assemblies of each zone are centrally symmetrical where this rotation is not of interest or, on the contrary, it may be desirable to contemplate the existence of a central asymmetry, where it is of interest to induce rotation of the conductive element about the centre of masses thereof, for example, to overcome friction and/or sticking forces.

The conductive element is usually physically enclosed in the intermediate space, between the first zone, the second zone and side walls.

To avoid sticking and high frictional forces it is advantageous that the conductive element have rounded external surfaces, preferably that it be cylindrical or spherical. The spherical solution minimises the frictional forces and sticking in all directions, while the cylindrical solution, with the bases of the cylinder facing the first and second zones allows reduced frictional forces to be achieved with the side walls and surfaces facing the condenser plates which are large and efficient as concerns the generation of the electrostatic forces.

Likewise, should the conductive element have an upper face and a lower face, which are perpendicular to the movement of the conductive element, and at least one side face, it is advantageous that the side face have slight protuberances. These protuberances will further allow reduction of sticking and frictional forces between the lateral face and the side walls of the intermediate space.

Advantageously the conductive element is hollow. This allows reduced mass and thus achieves lower inertia.

Should the electro-optical device have two condenser plates (the first plate and the second plate) and both being in the second zone, it is advantageous that the first condenser plate and the second condenser plate have the same surface area, since in this manner the minimal activation voltage is obtained for one same total device surface area.

Should the electro-optical device have two condenser plates (the first plate and the second plate) and the first condenser plate is in the first zone while the second plate is in the second zone, it is advantageous that the first condenser plate has a surface area that is equal to double the surface area of the second condenser plate, since in this manner the minimal activation voltage is obtained for one same total device surface area.

A further object of the invention relates to preferred uses for electro-optical devices according to the invention. Apart from use as an optical switch and as an optical commutator, the electro-optical device according to the invention may be used as a sensor for different physical magnitudes. In such cases, the physical magnitude which one wishes to measure exerts a force to move the conductive element and by means of a given voltage applied to the condenser plates a force is generated which counteracts the former. By sensing whether the state of passage of light is being modified, the voltage required to counteract the force generated by the magnitude to be measured may be modified. The determination of the voltage required allows determination of the physical magnitude one wishes to measure. In general, miniaturisation allows the inclusion of several sensors simultaneously, which makes the determination of the corresponding value more reliable. The increase in reliability is due to the possibility that these different sensors measure the same magnitude, and subsequently the mean is calculated. A particularly advantageous alternative is obtained by arranging an electro-optical device according to the invention with I/O points in both zones, since in this case one can measure the physical magnitude under study from the time elapsing between modification of the state of passage of light between the I/O points of one zone and modification of the state of passage of light between the I/O points of the other zone, at constant voltage (or even varying the voltage as a further parameter to be accounted for). Below are provided various specific examples:

Accelerometer: the force due to external acceleration moves the conductive element, separating the conductive element from the first stop. The voltage applied to the condenser plates creates an opposing force. When the conductive element reestablishes contact with the first stop and the state of passage of light is modified again, the voltage required can be determined and thus, the acceleration to which the conductive element has been subjected. This can also take place in reverse (this, in general is valid for all the sensors) such that it is the external acceleration that which approaches the conductive element to the first stop. Miniaturisation allows provision of various sensors, orientated according to the three coordinate axes. A specific example of this use is as a tiltmeter.

Pressure sensor: if the electric element separates two chambers subjected to different pressures (a pressure to be determined and a reference pressure), with the pressure of the air, or in general of any non conducting fluid, being applied to one of the faces of the conductive element, the latter will tend to move away from (or towards) the first stop. The voltage necessary to again bring the conductive element back towards the stop (or move it away therefrom) allows the pressure of said fluid or, specifically, the pressure differential between said fluid and the reference chamber to be determined. A particular example of this type of sensor would be a microphone.

Flowrate sensor: if the conductive element has an aperture through which can pass a current of fluid or if it has an extension which is immersed in a current of fluid, an electro-optical device according to the invention can be used as flowrate sensor. As in the above examples, by means of a given voltage applied to the condenser plates one can counteract the force generated by the magnitude one wishes to measure, in this case the hydraulic or aerodynamic force generated by the fluid current. As in the case of the pressure sensor, the fluid cannot be an electrical conductor.

Temperature sensor: In this case it should be taken into account that the time the electro-optical device takes to move from one stop to another basically depends upon the external acceleration, voltage applied and the surface area coefficients of the condenser plates. If these plates are made from materials having different thermal expansion coefficients, the surface area coefficients of the condenser plates will change with temperature. In this manner there is a relationship between the switching time and the temperature for a given voltage applied to the plates. For the same reason, the minimum voltage necessary for the electro-optical device to commutate will depend on the temperature.

Acoustic applications (loudspeakers). When the conductive element collides with the stops or against the condenser plates which attract it, a noise will be produced. By coordinating a large number of electro-optical devices, which can be integrated in a single chip, one can gather the different acoustic waves together in phase and thus create a resulting acoustic wave that is audible. This audible acoustic wave will be highly directional. This may be an advantage when the use of unidirectional waves is of interest; alternatively the electro-optical devices can be distributed and/or activated in different directions and/or time phase steps to obtain a multidirectional wave. It is also possible to control directionality by controlling the precise moment in which each electro-optical device is activated, which is to say, by controlling the relative time phase steps between the electro-optical devices. In this manner one can dynamically change the directionality of the acoustic wave, so that it may be directed towards one place or another without having to change the geometric distribution of the electro-optical devices. The fact that each electro-optical device modifies the state of passage of light when in contact with the first stop allows a determination of the exact moment in which the conductive element collides with said first stop.

Detector of Coriolis forces (usually known as gyrostats). These detectors determine the rotational speed of an object by determining the Coriolis force. To do so one needs an electro-optical device having condenser plates arranged in the first zone and in the second zone and first stops and second stops arranged on an axis perpendicular to the first zone-second zone axis. The conductive element should be in continual movement from one end to the other so that it is always provided with a given speed, which will depend on the voltage applied to the condenser plates. If there is a rotational velocity which is perpendicular to the plane formed by the axis of movement (first zone-second zone axis), and the first stops and second stops, then the conductive element will experience Coriolis acceleration which will be perpendicular to the first zone-second zone axis. This will mean that the conductive element touches the stops on one side (or on the opposite side, depending on the rotational direction) if the voltage applied to the condenser plates and, thus, the speed with which the conductive element moves, is sufficiently high. On touching the stops, the state of passage of light will be modified, thus confirming that the conditions necessary for such have been obtained. The magnitude of the external rotation will be, thus, related with the magnitude of the voltage applied to the condenser plates, and the rotational direction can be known based on which of the two pairs of contacts has been touched, taking into account the direction of the velocity being proportioned at such time to the conductive element. Sensors of this type may be included simultaneously in three perpendicular directions, which allows the value of any rotation in space to be determined.

Gas sensor. Should the conductive element be of a material capable of reacting with and/or absorbing molecules of a given gas (or should such material be incorporated in the conductive element) a conductive element is obtained having a variable mass depending on the concentration of said gas. This change in mass influences the activation voltage, as well as the time lapse in moving from one end to another. The gas concentration can thus be determined.

In general, in all sensors cited above one can determine the corresponding magnitude by detecting in each case what is the minimum voltage necessary to switch the electro-optical device, or detect which is the switching time for a fixed applied voltage. In general it is simpler to detect the switching time, since it can be increased very simply using digital technology, while generating variable voltages implies using analogue circuits. However when detecting the voltage which switches the electro-optical device, there is the advantage that the electro-optical device commutates much less frequently, reducing wear and increasing long term reliability and working life.

BRIEF DESCRIPTION OF THE DRAWINGS

Further advantages and characteristics of the invention will become evident from the following description in which, without any limitation, there are described some preferred embodiments of the invention, with reference to the appended drawings, in which:

FIG. 7 is a plan view of a second variant of the electro-optical device of FIG. 4;

FIG. 8 is a plan view of a third variant of the electro-optical device of FIG. 4

As shall be seen below, the preferred embodiments of the invention illustrated in the Figures include a combination of the several different alternatives and options considered above, while a person skilled in the art will be able to see that they are alternatives and options may be combined together in different ways.

DETAILED DESCRIPTION OF SOME EMBODIMENTS OF THE INVENTION

Figure 1:
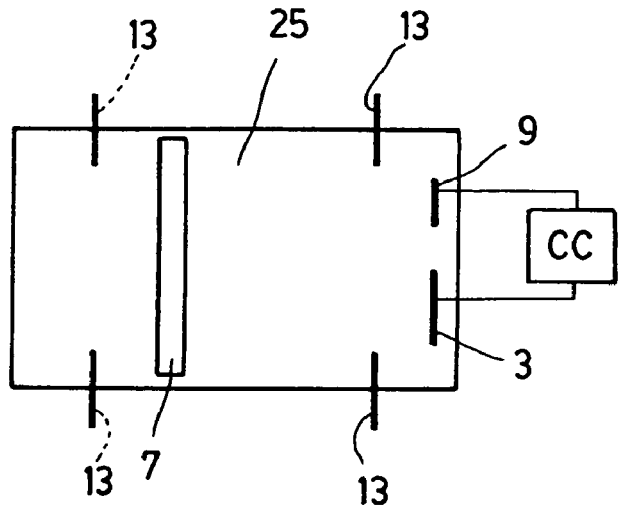
FIG. 1 is a simplified diagram of an electro-optical device with two condenser plates in the second zone thereof.

FIG. 1 shows a first basic functioning mode of an electro-optical device according to the invention. The electro-optical device defines an intermediate space 25 in which is housed a conductive element 7, which can move freely along the intermediate space 25, since physically it is a loose part which is not physically joined to the walls which define the intermediate space 25. The electro-optical device also defines a first zone, on the left in FIG. 1, and a second zone, on the right in FIG. 1. In the second zone are arranged a first condenser plate 3 and a second condenser plate 9. In the example shown in FIG. 1, both condenser plates 3 and 9 have different surface areas, although they can be equal with respect to one another. The first condenser plate 3 and the second condenser plate 9 are connected to a CC control circuit. On applying a voltage between the first condenser plate 3 and the second condenser plate 9, the conductive element is always attracted towards the right in FIG. 1, towards the condenser plates 3 and 9. The conductive element 7 will be moved towards the right until being stopped by first stops 13, at which time the state of passage of light in an optical circuit not shown in this diagram will be modified.

Figure 2:
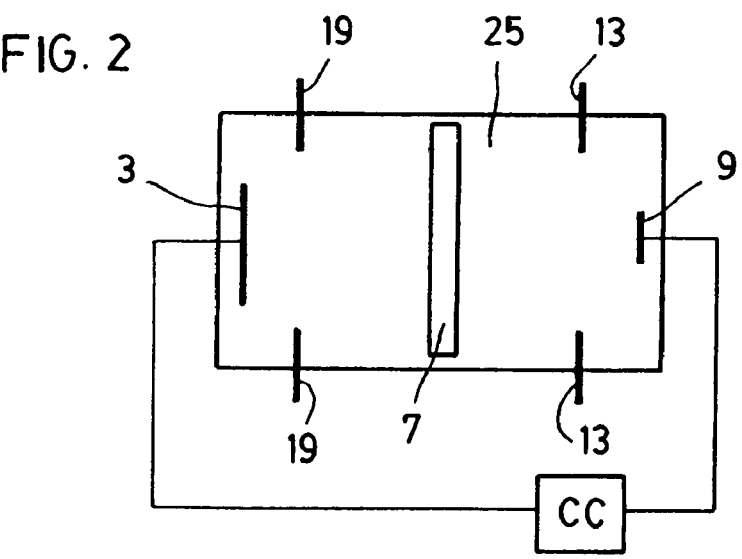
FIG. 2 is a simplified diagram of an electro-optical device with two condenser plates, one in each of the zones thereof.

FIG. 2 shows a second basic functioning mode for an electro-optical device according to the invention. The electro-optical device again defines an intermediate space 25 in which is housed a conductive element 7, which can move freely along the intermediate space 25, a first zone, on the left in FIG. 2, and a second zone, on the right in FIG. 2. In the second zone is arranged a second condenser plate 9 while in the first zone is arranged a first condenser plate 3. The first condenser plate 3 and the second condenser plate 9 are connected to a CC control circuit. On applying a voltage across the first condenser plate 3 and the second condenser plate 9, the conductive element is always attracted to the right of the FIG. 2, towards the smaller condenser plate, i.e. towards the second condenser plate 9. For this reason, the fact that in the example shown in FIG. 2 both condenser plates 3 and 9 have different surface areas is, in this case, absolutely necessary, since if they had equal surface areas, the conductive element 7 would not move in any direction. The conductive element 7 will move towards the right until being stopped by first stops 13, at which time the state of passage of light in an optical circuit not shown in this diagram will be modified. On the left there are second stops 19 which in this case do not serve any reference function for the modification of the state of passage of light of an optical circuit, but which prevent the conductive element 7 from abutting the first condenser plate 3. In this case the stops 19 could be removed, since no problem is posed by the conductive element 7 entering into contact with the first condenser plate 3. This is because there is only one condenser plate on this side, since if there were more than one and if they had been connected to different voltages then the stops could be necessary to avoid a short-circuit.

The configurations of the electro-optical devices of FIGS. 1 and 2 are suitable for being used as sensors, in which the magnitude to be measured exercises a force which is that which will be counteracted by the electrostatic force induced in the conductive element 7. Such as represented, in both cases the magnitude to be measured must exercise a force tending to move the conductive element 7 away from the first stops 13, while the electrostatic force will tend to move it towards them. However, an electro-optical device can be designed to work exactly in the opposite way: such that the magnitude to be measured would tend to move the conductive element 7 towards the first stops, while the electrostatic force would tend to move it away therefrom. In this case, the first stops 13 would need to be positioned on the left in FIGS. 1 and 2. In FIG. 1 this possibility has been shown with the reference numbers connected by a broken line. If the stops are placed on both sides, then the sensor can detect magnitude in both directions, although the optical circuit would have to be duplicated and control circuit would have to change the algorithm, from trying to move towards to trying to move away, when a change in direction is detected as having occurred, as will happen when a modification of the state of passage of light is not achieved with the minimum voltage, which is zero. It should be recalled that the sign of the voltage applied does not effect the direction of movement of the conductive element 7.

Figure 3:
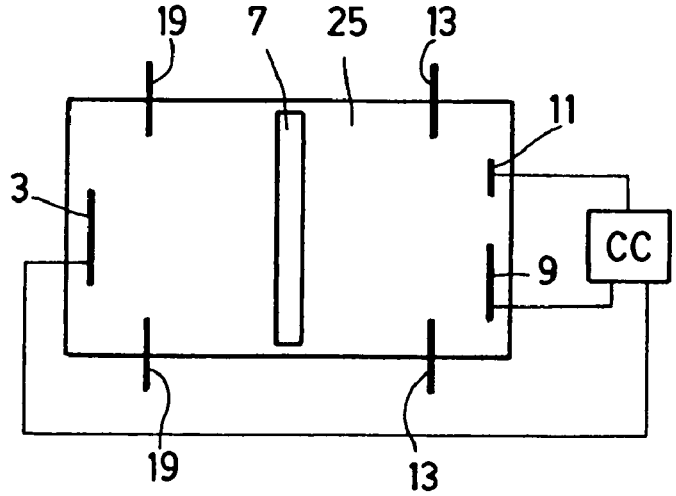
FIG. 3 is a simplified diagram of an electro-optical device with three condenser plates.

To achieve moving the conductive element 7 in both directions by means of electrostatic forces, it is necessary to provide a third condenser plate 11, as shown in FIG. 3. Given that the conductive element 7 will always move towards where the smallest condenser plate is located, it is necessary, in this case, that the third condenser plate 11 be smaller than the first condenser plate 3, but that the sum of the surface areas of the second condenser plate 9 and the third condenser plate 11 be larger than the first condenser plate 3. In this manner, by activating the first condenser plate 3 and the second condenser plate 9, by connecting them to different voltages, but not the third condenser plate 11, which will remain in a state of high impedance, the conductive element 7 can be moved to the right, while by activating the three condenser plates 3, 9 and 11 the conductor element 7 can be moved to the left. In the latter case the second condenser plate 9 and the third condenser plate 11 are supplied at one same voltage, and the first condenser plate 3 is at a different voltage. The electro-optical device of FIG. 3 has, in addition, second stops 19, in a manner that these second stops 19 allow the modification of the state of passage of light of a second optical circuit to be modified.

Should two condenser plates be provided in each of the first and second zones, the movement of the conductive element 7 can be solicited in two different ways:

by applying a voltage across the two condenser plates of one same zone, so that the conductive element is attracted by them (functioning as in FIG. 1)

by applying a voltage across one condenser plate of one zone and one (or both) condenser plate(s) of the other zone, such that the conductive element 7 is attracted towards the zone in which the electrically charged condenser surface area is smaller (functioning as in FIG. 2).

Hereinafter it will be described how these mechanisms may modify the state of passage of light of an optical circuit.

Figure 4:
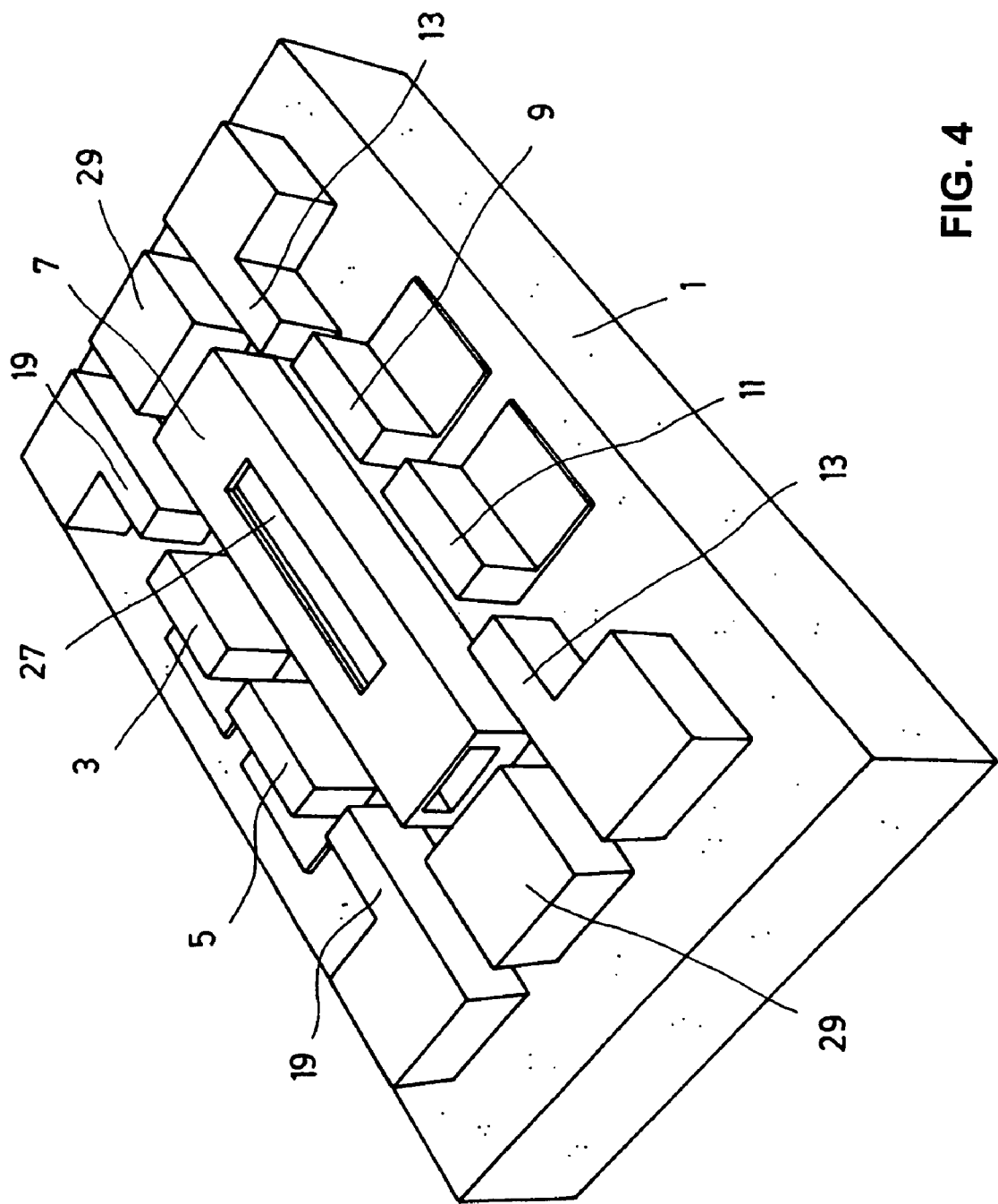
FIG. 4 is a perspective view of a first embodiment of an electro-optical device according to the invention, uncovered.

In FIG. 4 there is to be seen an electro-optical device designed to be manufactured with EFAB technology. This technology of manufacturing micromechanisms by means of layer depositing is known to persons skilled in the art, and allows the production of many layers and presents a great deal of versatility in the design of three-dimensional structures. The electro-optical device is mounted on a substrate 1 which serves as support, and which in several of the appended drawings has not been illustrated in the interest of simplicity. The electro-optical device has a first condenser plate 3 and a fourth condenser plate 5 arranged on the left (according to FIG. 2) of a conductive element 7, and a second condenser plate 9 and a third condenser plate 11 arranged on the right of the conductive element 7. The electro-optical device also has two first stops 13, and two second stops 19. The electro-optical device is covered in its upper part, although this cover has not been shown in order to be able to clearly note the interior details. The cover extends between the two side walls 29, above the conductive element 7.

The conductive element 7 has a hollow internal space 27.

Figure 5:
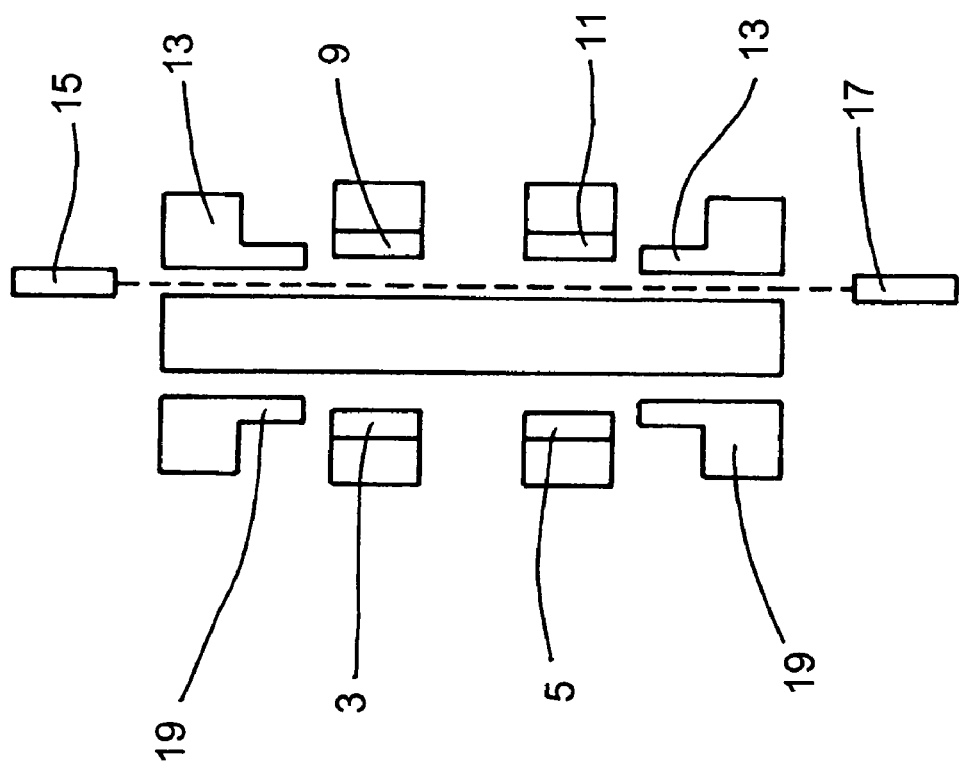
FIG. 5 is a plan view of the electro-optical device of FIG. 4.

The electro-optical device goes from left to right, and vice versa, according to FIG. 5, across the intermediate space 25. FIG. 5 shows the cover preventing the conductive element from coming out at the top end. As can be observed the first stops 13 and the second stops 19 are closer to the conductive element 7 than the condenser plates 3, 5, 9 and 11. In this manner the conductive element 7 can move from left to right, without interfering with the condenser plates 3, 5, 9 and 11, and their corresponding control circuits. FIG. 5 shows how this movement allows the state of passage of light of a beam of light propagating from one I/O point to another I/O point of an optical circuit may be modified. In fact, the electro-optical device is crossed by a beam of light exiting from a first I/O point 15 towards a second I/O point 17. When the conductive element 7 is in contact with the first stops 13 (which could be a single stop if it were arranged in a central position) the passage of the light beam is blocked, which could be detected by the corresponding circuit.

Figure 6:
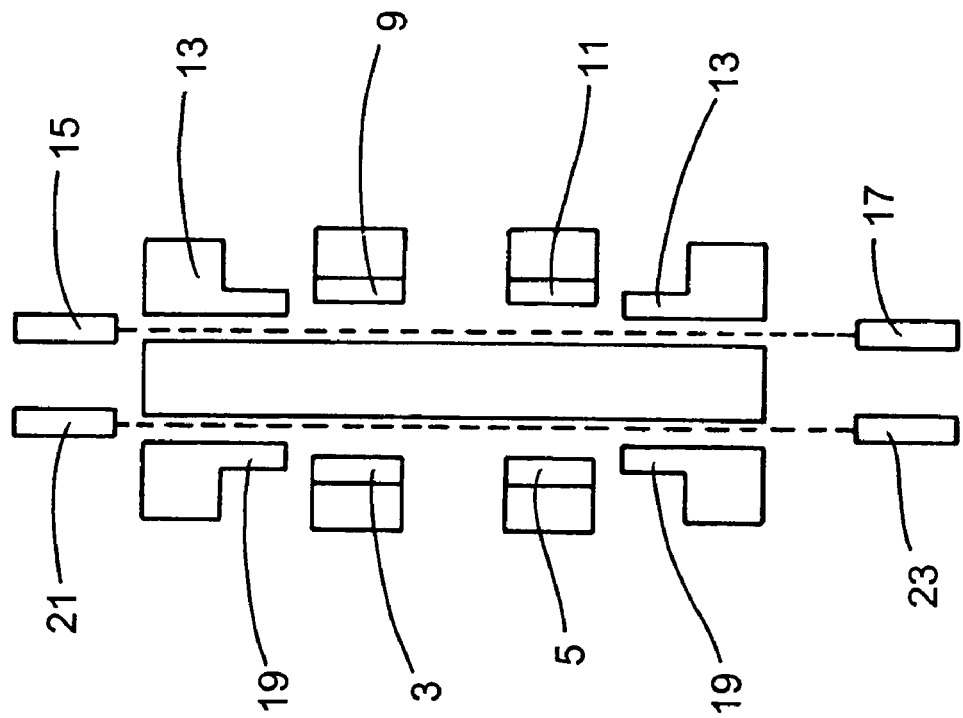
FIG. 6 is a plan view of a first variant of the electro-optical device of FIG. 4, with two pairs of I/O points.

FIG. 6 shows a variant of the above electro-optical device. In this case, there are tow optical circuits, such that there are four I/O points 15, 17, 21 and 23. Depending on whether the conductive element 7 is contacting the first stops 13 or the second stops 19, it will be blocking the light beam from one or the other of the two optical circuits.

In the variant shown in FIG. 7, it is to be seen that the conductive element 7 is provided with a projection 47 which projects outwardly of the walls enclosing the conductive element 7. It is the projection 47 that modifies the state of passage of light between the first I/O point 15 and the second I/O point 17. As may be seen, therefore, the electro-optical device, as should be understood from the present description and claims, is not only the physical container containing the conductive element 7 in the interior thereof, but includes the I/O points, both if these are on the surface of the container itself, and if they are physically separate therefrom. Likewise, it is not necessary for the light beam on whose state of passage it is wanted to intervene to physically cross the container containing the conductive element 7, but it may also happen that the light beam is propagated outside the container.

Further, it is also possible to design a conductive element 7 having a projection 47 although the light beam crosses the container. Thus, for example, it is possible to design an electro-optical device such as that of FIG. 5 in which the conductive element 7 has a projection equivalent to the projection 47, but shorter, such that the free end thereof is housed between the second condenser plate 9 and the third condenser plate 11. This projection allows the interruption of the light beam between the first I/O point 15 and the second I/O point 17 to be better guaranteed.

It is not necessary either for the stops to be physically inside the container housing the conductive element 7. Thus, for example, in the electro-optical device of FIG. 7, the first stop 13 could be a single stop and be physically adjacent the free end of the projection 47.

FIG. 8 shows another variant of the electro-optical device. In this case, the light beam is not simply blocked, but it is deviated by reflection to a third I/O point.

Figure 9:
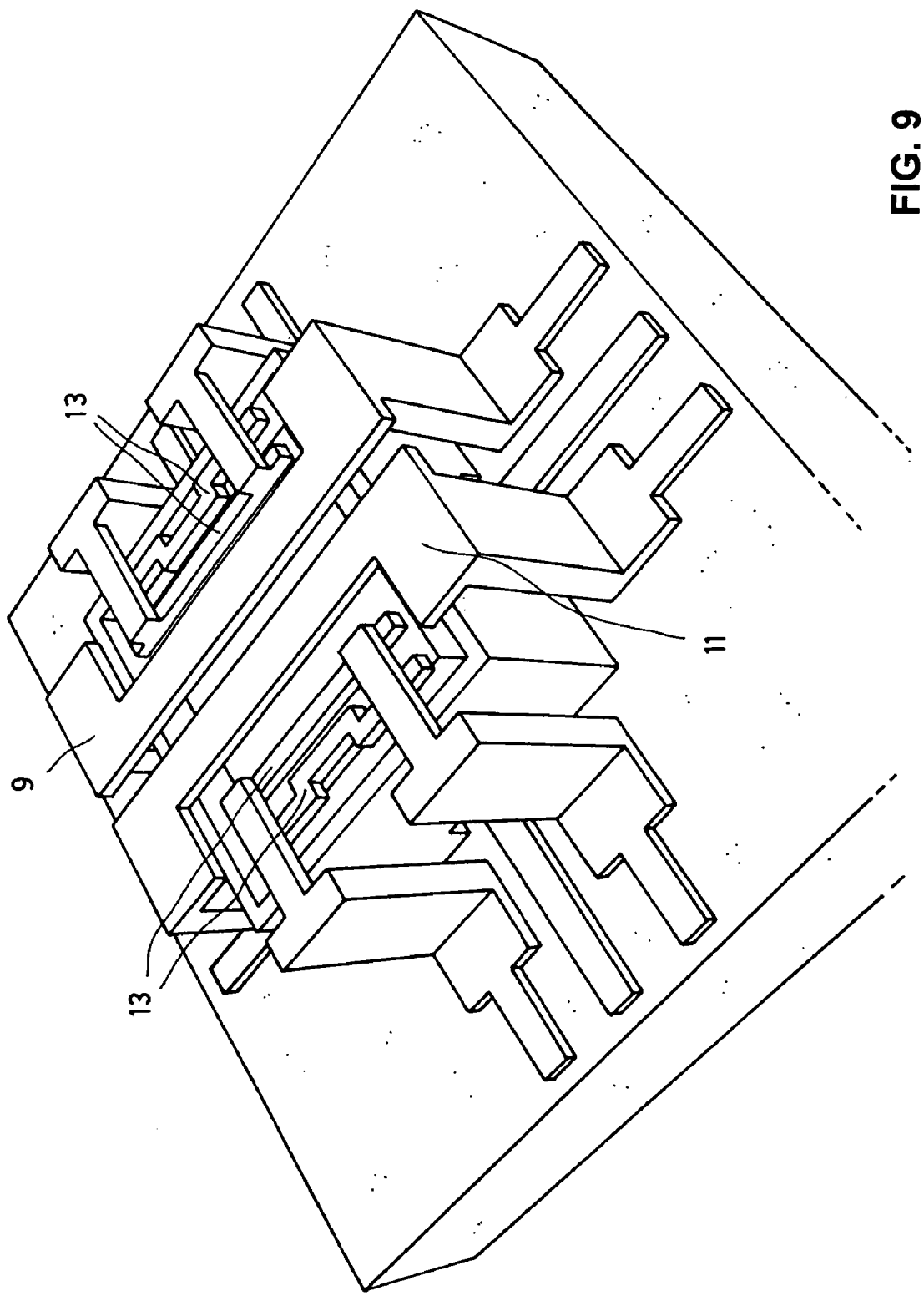
FIG. 9 is a perspective view of a second embodiment of an electro-optical device according to the invention.
Figure 10:
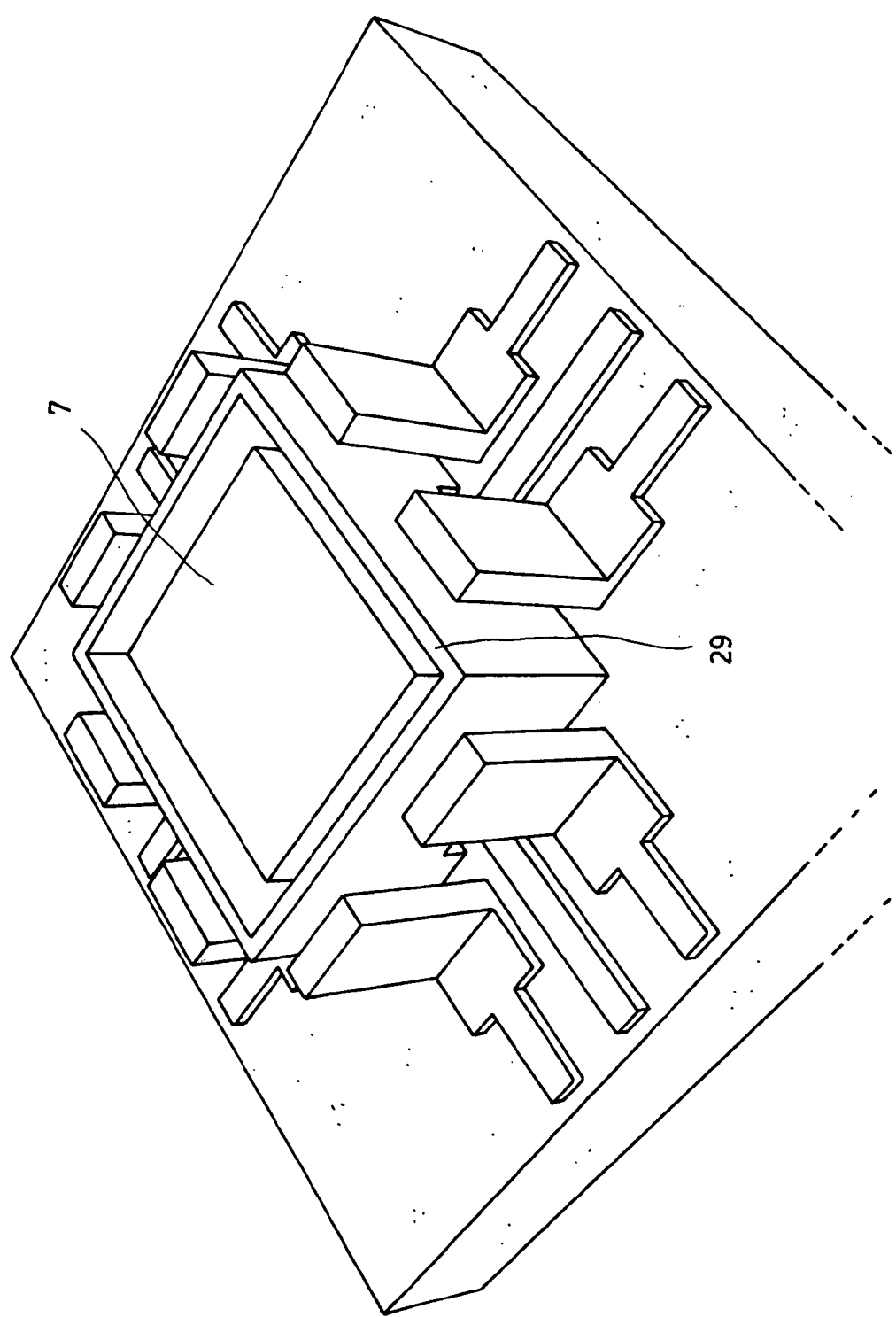
FIG. 10 is a perspective view of the electro-optical device of FIG. 9 from which the components of the upper end have been removed.
Figure 11:
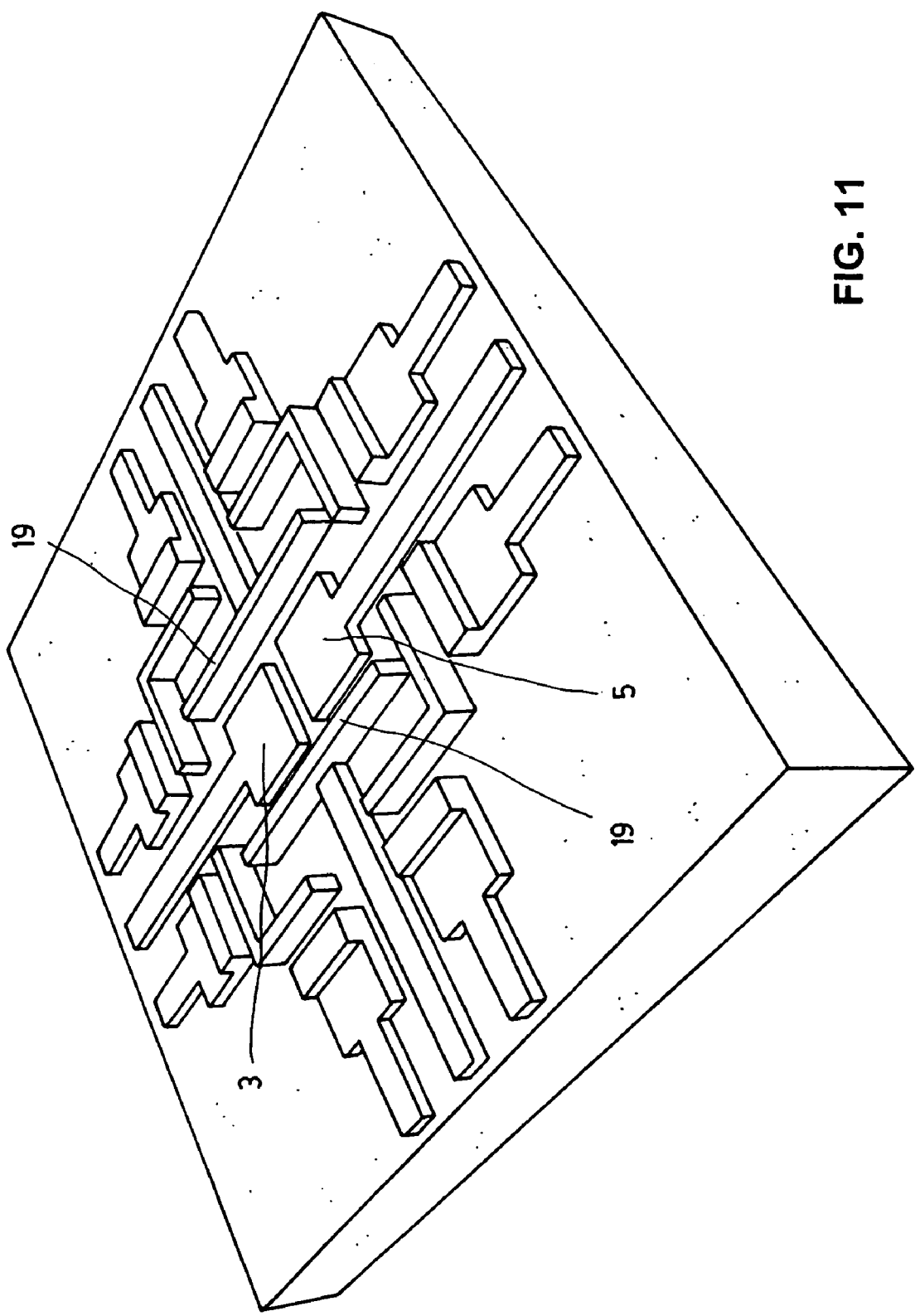
FIG. 11 is a perspective view of the lower members of the electro-optical device of FIG. 9.

In FIGS. 9 to 11 there is to be seen another electro-optical device designed to be manufactured with EFAB technology. In this case the conductive element 7 moves vertically, in accordance with FIGS. 9 to 11. The use of one or the other movement alternative in the electro-optical device depends on design criteria. The manufacturing technology consists of depositing several layers. In all Figures the vertical dimensions are exaggerated, which is to say that the physical devices are much flatter than as shown in the Figures. Should one wish to obtain larger condenser surfaces it would be preferable to construct the electro-optical device with a form similar to that shown in the FIGS. 9 to 11 (vertical electro-optical device), while an electro-optical device with a form similar to that shown in FIGS. 4 to 8 (horizontal electro-optical device) would be more appropriate should a lesser number of layers be desired. Should certain specific technologies be used (such as those usually known as polyMUMPS, Dalsa, SUMMIT, Tronic's, Qinetiq's, etc) the number of layers is always very limited. The advantage of the vertical electro-optical device is that larger surfaces are obtained with a smaller chip area, and this implies much lower activation voltages (using the same chip area).

Conceptually the electro-optical device of FIGS. 9 to 11 is very similar to the electro-optical device of FIGS. 4 to 8, and has the first condenser plate 3 and the fourth condenser plate 5 arranged in the lower part (FIG. 8) as well as the second stops 19. As can be seen the second stops 19 are above the condenser plates, such that the conductive element 7 can bear on the second stops 19 without entering into contact with the first and fourth condenser plates 3, 5. At the upper end (FIG. 6) there is the second condenser plate 9, the third condenser plate 11 and two first stops 13.

The same as the electro-optical device of FIGS. 4 to 8, the electro-optical device of FIGS. 9 to 11 may act in different ways, which have not been shown in FIGS. 9 to 12, for greater clarity thereof. Thus, in FIG. 12, there is shown an electro-optical device which reflects the light emitted by a first I/O point 15 and sends it to a second I/O point 17 when the conductive element 7 is, for example, touching the first stops 13. When the conductive element 7 moves towards the other end of the intermediate space 25, i.e., when it touches the second stops 19, the light beam will be reflected with the same angle as before but towards another position in the space. In this new position there may be positioned a third I/O point 21 which will receive the reflected light in this case.

In general, when it is desired that the conductive element 7 should reflect a light beam, it must comprise therein the corresponding reflective surface. It is possible to generate reflective surfaces with the technologies available on the market and known to a person skilled in the art, nevertheless, the design of vertical electro-optical device having reflective surfaces on the top face thereof is preferable to the design of horizontal electro-optical device requiring vertical reflective surfaces.

Figure 12:
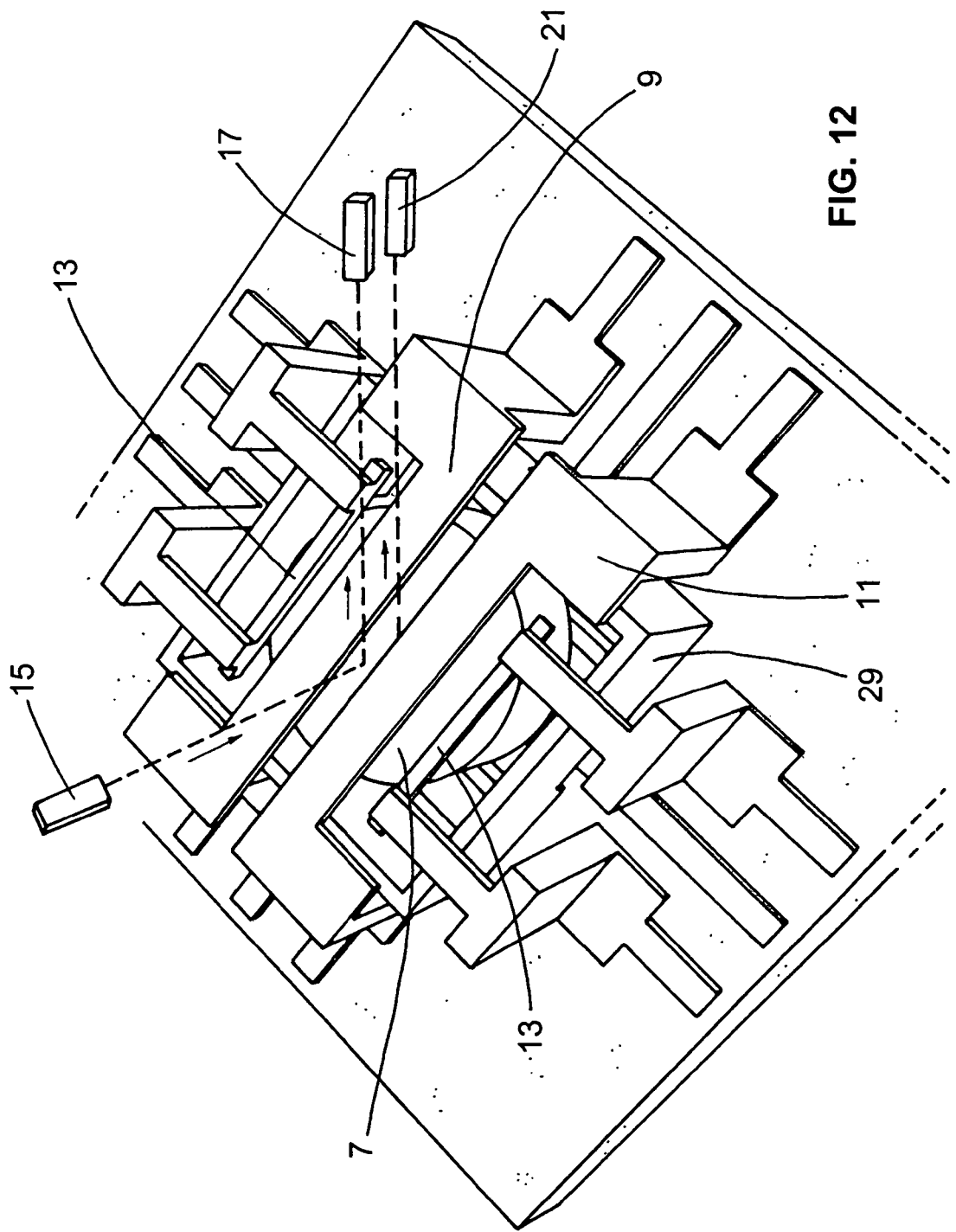
FIG. 12 is a perspective view of a third embodiment of an electro-optical device according to the invention.
Figure 17:
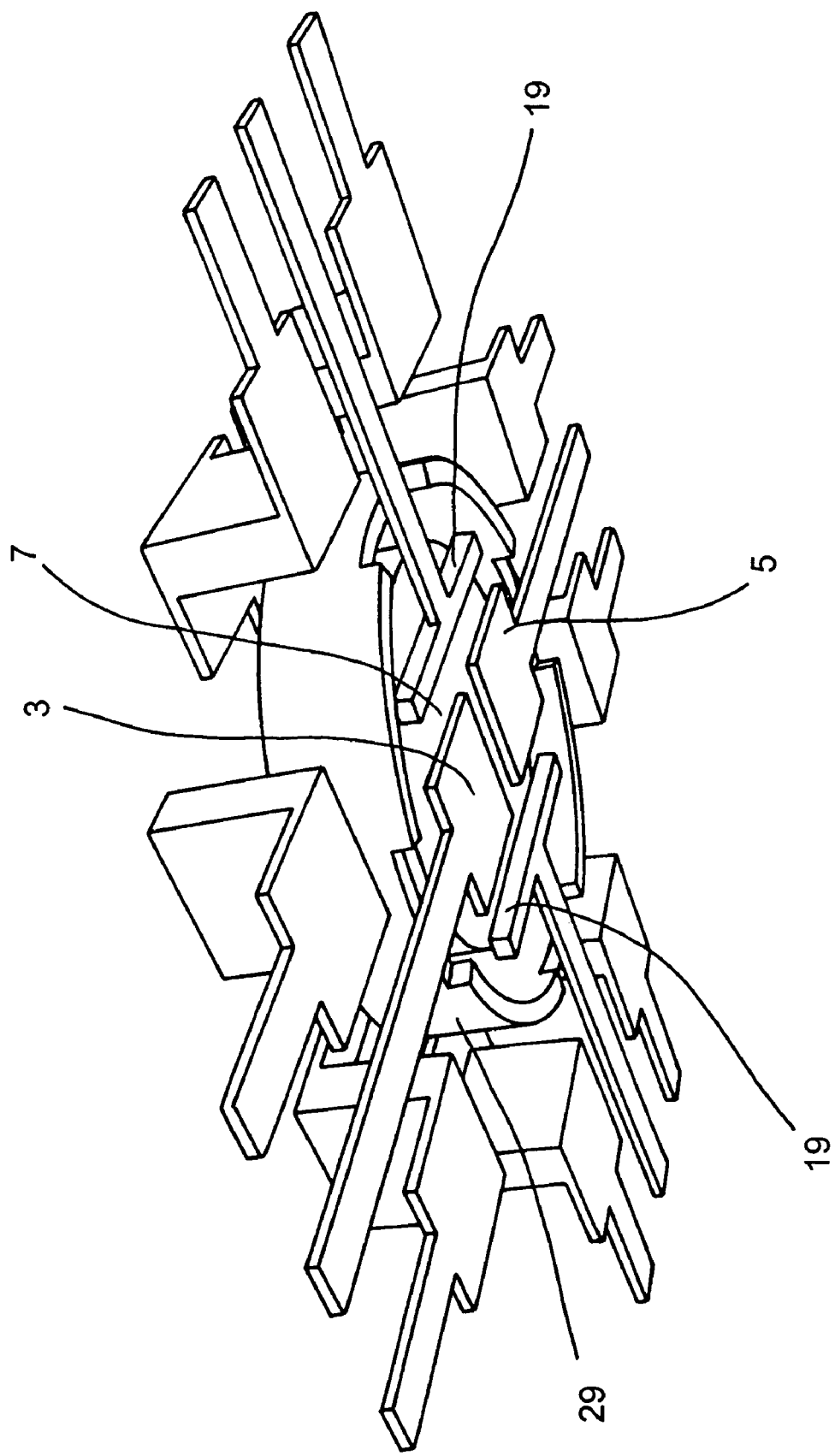
FIG. 17 is a perspective view of a sixth embodiment of an electro-optical device according to the invention.
Figure 18:
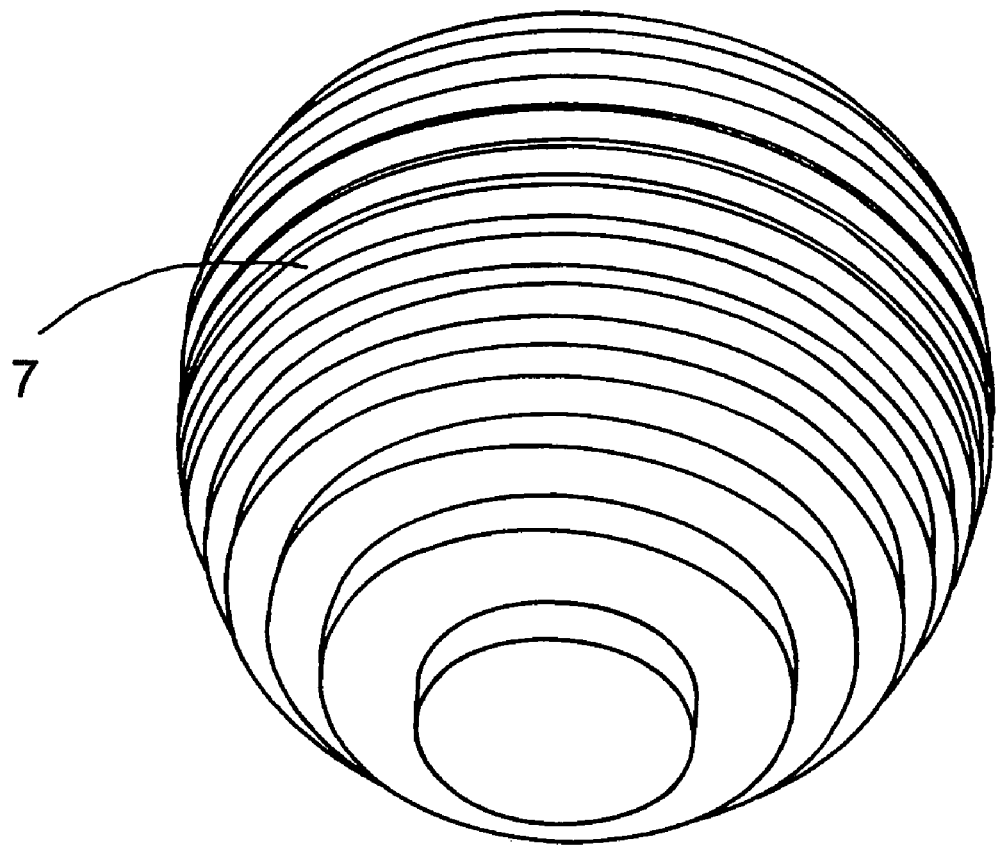
FIG. 18 shows a sphere produced with surface micromachining.

Actually, the electro-optical device shown in FIG. 12 is not identical to that of FIGS. 9 to 11, but is a slightly different embodiment in the sense of having a cylindrical instead if parallelepipedic conductive element 7. FIG. 17 shows another electro-optical device having the conductive element 7 cylindrical. In the case of the electro-optical device of FIG. 12, the side walls 29 surrounding the conductive element are parallelepipedic while in the electro-optical device of FIG. 17 the side walls 29 surrounding the conductive element 7 are cylindrical. In turn, in FIG. 18, there is shown a sphere manufactured by surface micromachining, where it is to be seen that it is formed by a plurality of cylindrical discs of varying diameter. An electro-optical device with a spherical conductor element 7 like that of FIG. 18 may be, very similar conceptually to that of FIG. 12 or 17, replacing the cylindrical conductive element 7 with the spherical one. It is only necessary to take into account certain geometric adjustments in the arrangement of the condenser plates and the stops, to avoid the spherical conductive element 7 first touching the condenser plates and not the stops. As already mentioned above, the purpose of these conductive elements having rounded external surfaces is to reduce the frictional forces and sticking.

Generally, the condenser plates and the stops have been mentioned in the present description and in the claims as though they were different physical members, and in certain cases this will be so, since if there is a voltage applied across the condenser plates arranged in one same zone (first condenser plate 3 and fourth condenser plate 5 or second condenser plate 9 and third condenser plate 11), the conductive element 7 should not touch them so as not to cause a short-circuit. Nevertheless, if the condenser plates in one same zone (first condenser plate 3 and fourth condenser plate 5 or second condenser plate 9 and third condenser plate 11) are at the same voltage and in particular if it is at VCC or GND, then there is no objection for the conductive element 7 physically to touch the condenser plates. In this latter case, the "condenser plate" and "stop" functions may be performed jointly by the same physical element. Even where there is a voltage applied across the condenser plates of one same zone, the condenser plates could be arranged in a non-aligned form, so that the conductive element 7 touches only one of them (or all of those that are at the same voltage). In this way, short-circuits are also avoided.

Figure 13:
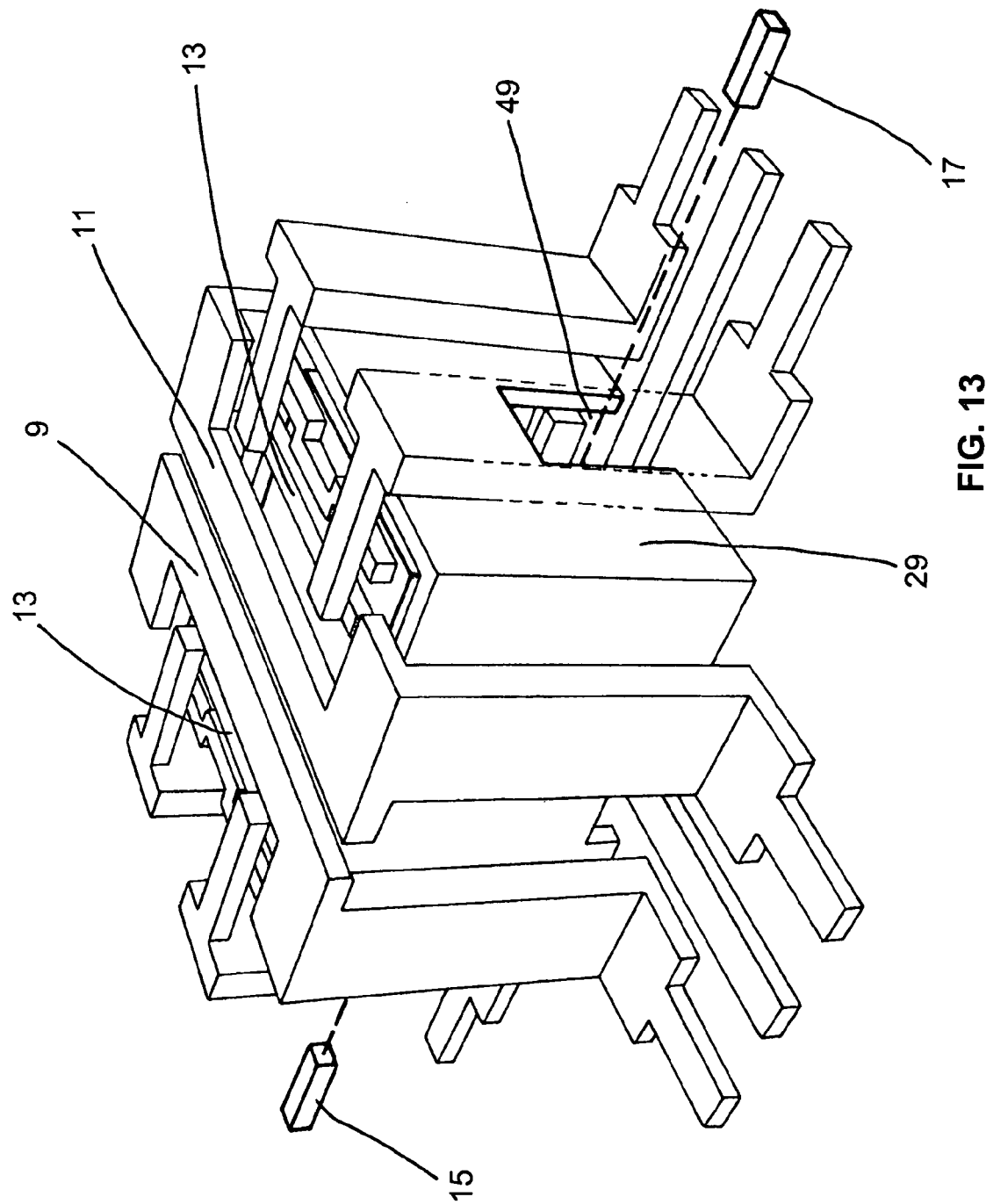
FIG. 13 is a perspective view of a fourth embodiment of an electro-optical device according to the invention.
Figure 14:
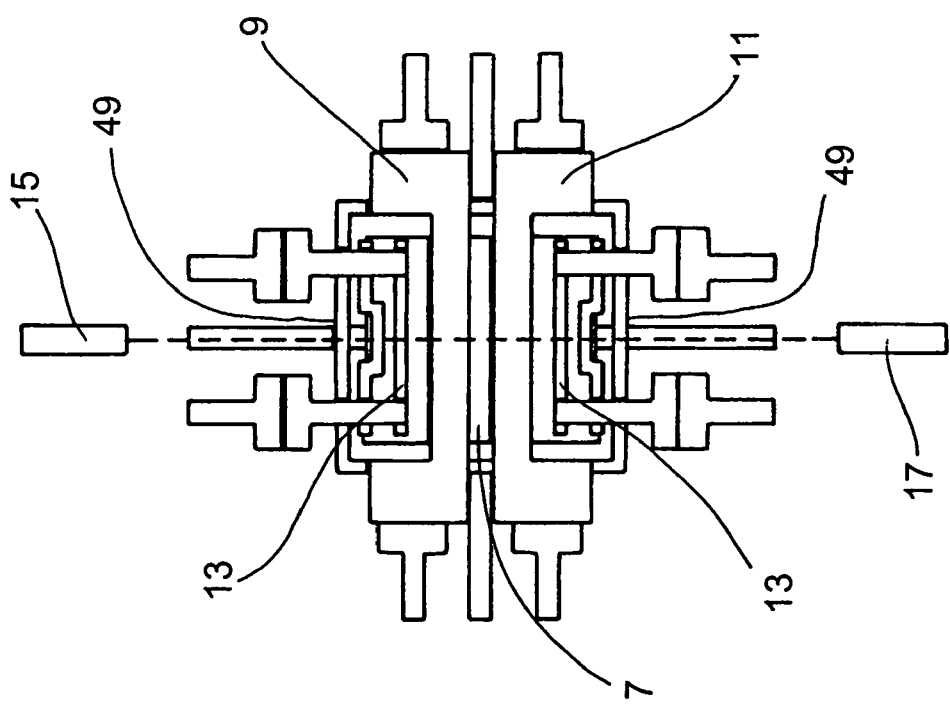
FIG. 14 is a plan view of the electro-optical device of FIG. 13.

The electro-optical device of FIG. 13 has an aperture 49 in the side wall 29 thereof through which a light beam may be propagated when the conductive element 7 is at the top. At the rear there is a further aperture such that the light beam may reach the corresponding second I/O point. FIG. 14 is a plan view showing how the light beam is propagated from the first I/O point 15 to the second I/O point 17 passing through the walls 29. Likewise, it could be understood that the apertures 49 themselves are the I/O points mentioned in the present description and claims, since what happens beyond the aperture 49 is irrelevant for the present invention.

Another variant of the electro-optical device of FIG. 13 is obtained when a second pair of apertures 49 is included in the upper portion of the side wall 29. In this case there may be interaction on two optical circuits simultaneously, in a manner equivalent to that shown in FIG. 6. The second pair of apertures 49 may be above the first pair of apertures 49, such that the light beams are parallel, or it may be arranged perpendicularly to the first pair of apertures 49, in which case the light beams will be perpendicular (FIG. 12).

Figure 15:
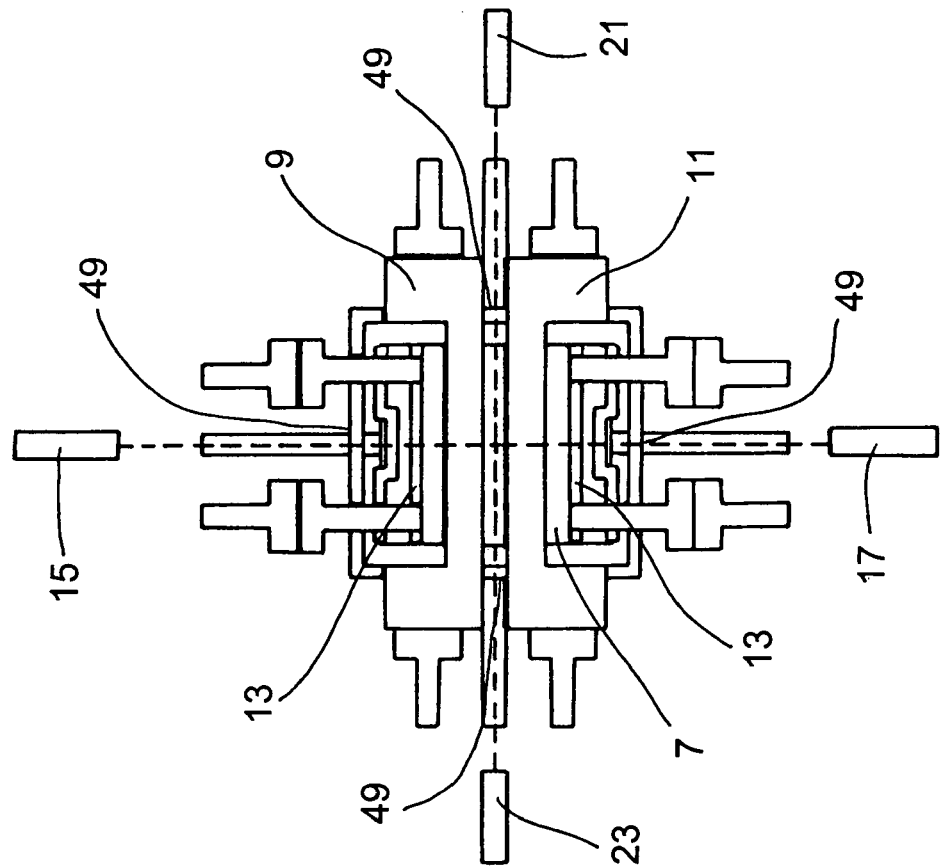
FIG. 15 is a plan view of a variant of the electro-optical device of FIG. 13.

Yet another variant may be obtained by arranging two pairs of apertures 49 at the lower portion of the wall 29, arranged perpendicular to each other. In this way the conductive element 7 would simultaneously interrupt two light beams. A plan view of this solution would likewise be FIG. 15.

Figure 16:
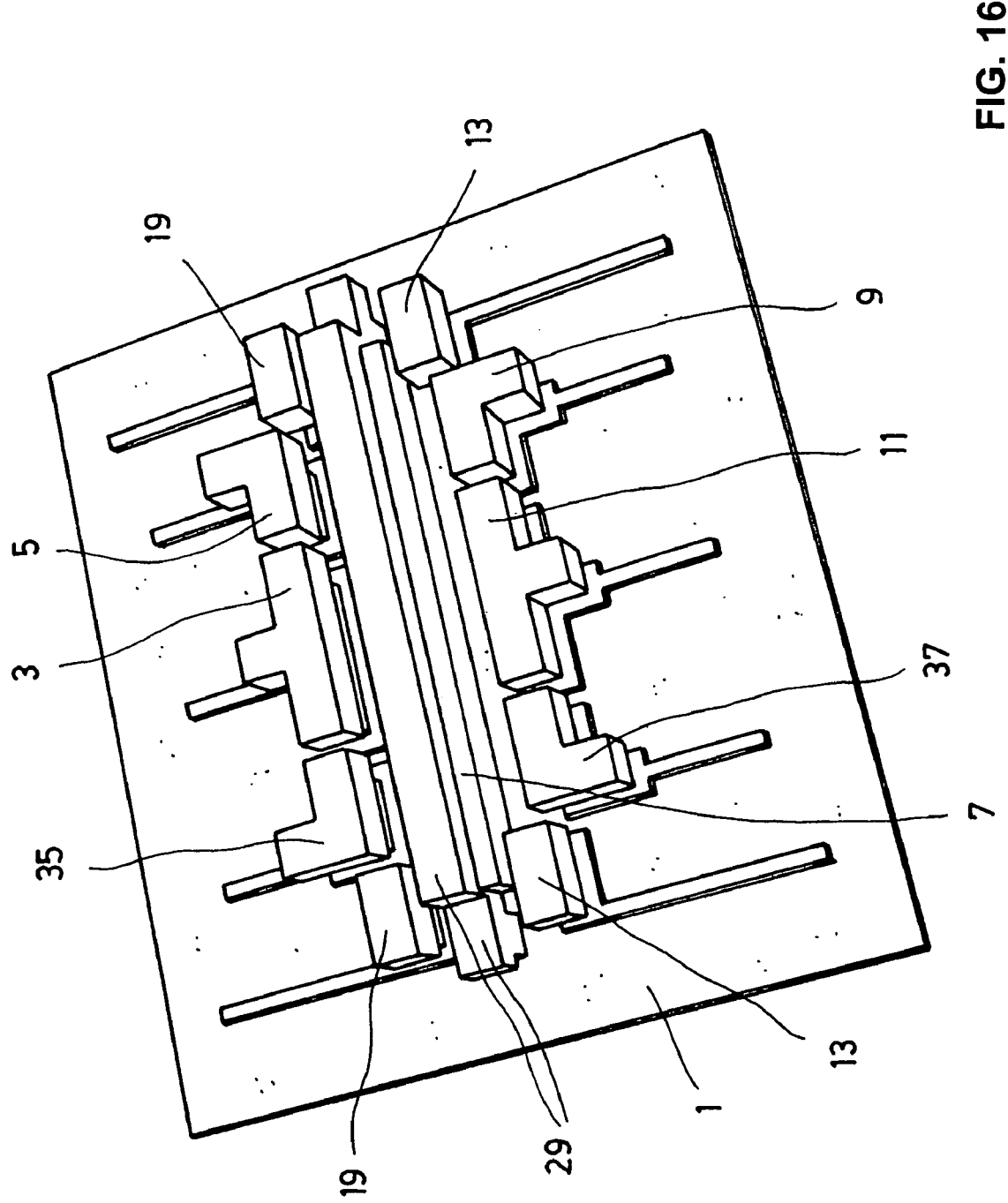
FIG. 16 is a perspective view of a fifth embodiment of an electro-optical device according to the invention.

The electro-optical device shown in FIG. 16 is designed to be manufactured with polyMUMPS technology. As already mentioned, this technology is known to a person skilled in the art, and is characterised by being a surface micromachining with three structural layers and two sacrificial layers. However, conceptually it is similar to the electro-optical device shown in FIGS. 4 to 8, although there are some differences. Thus in the electro-optical device of FIG. 16 the first condenser plate 3 is equal to the third condenser plate 11, but is different from the second condenser plate 9 and the fourth condenser plate 5, which are equal to each other and smaller than the former. Further, it also has a fifth condenser plate 35 and a sixth condenser plate 37.

Figure 19:
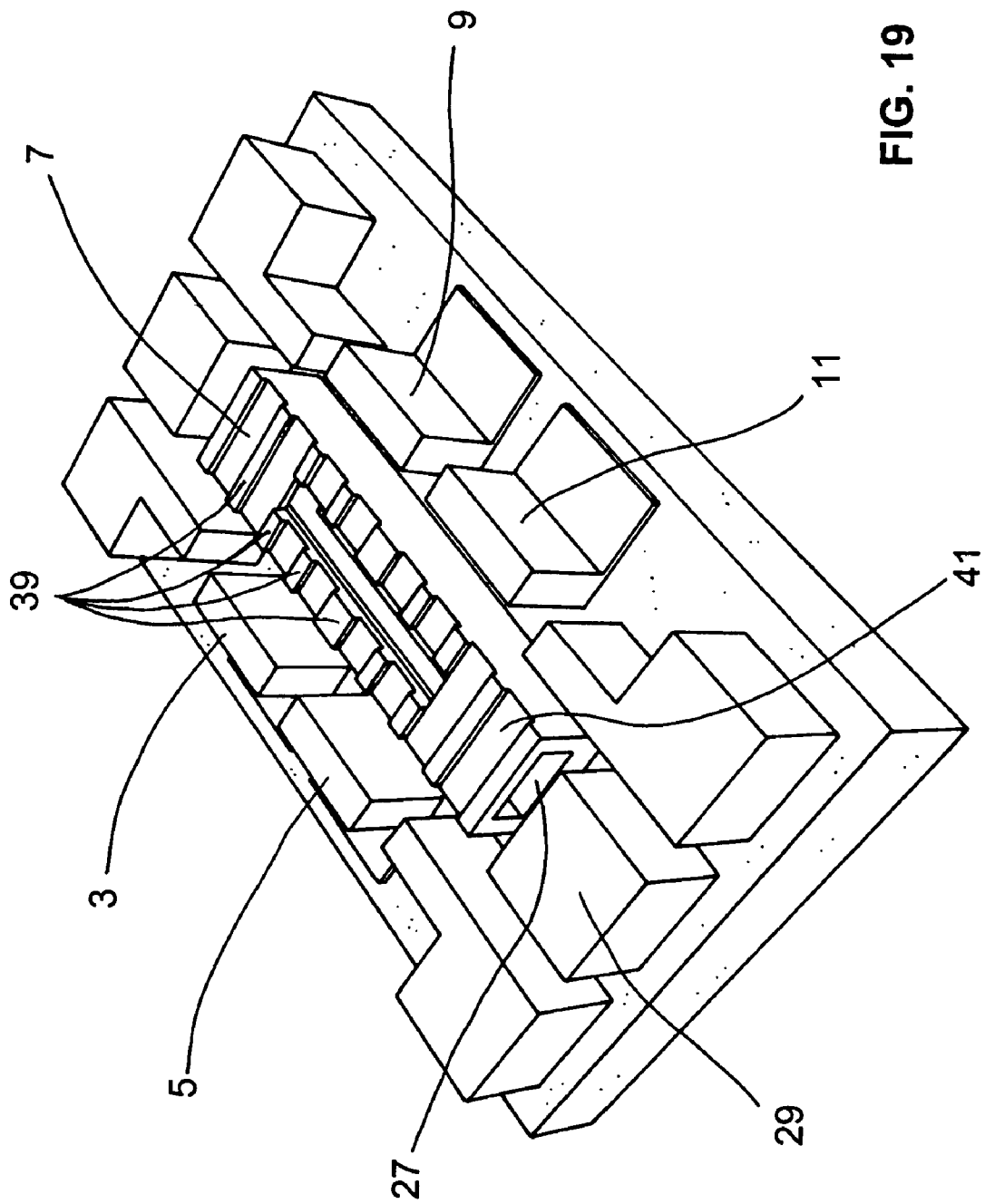
FIG. 19 is a perspective view of a seventh embodiment of an electro-optical device according to the invention.

FIG. 19 shows a variant of the electro-optical device illustrated in FIGS. 4 to 8. In this case the conductive element 7 has protuberances 39 in its side faces 41.

Figure 20:
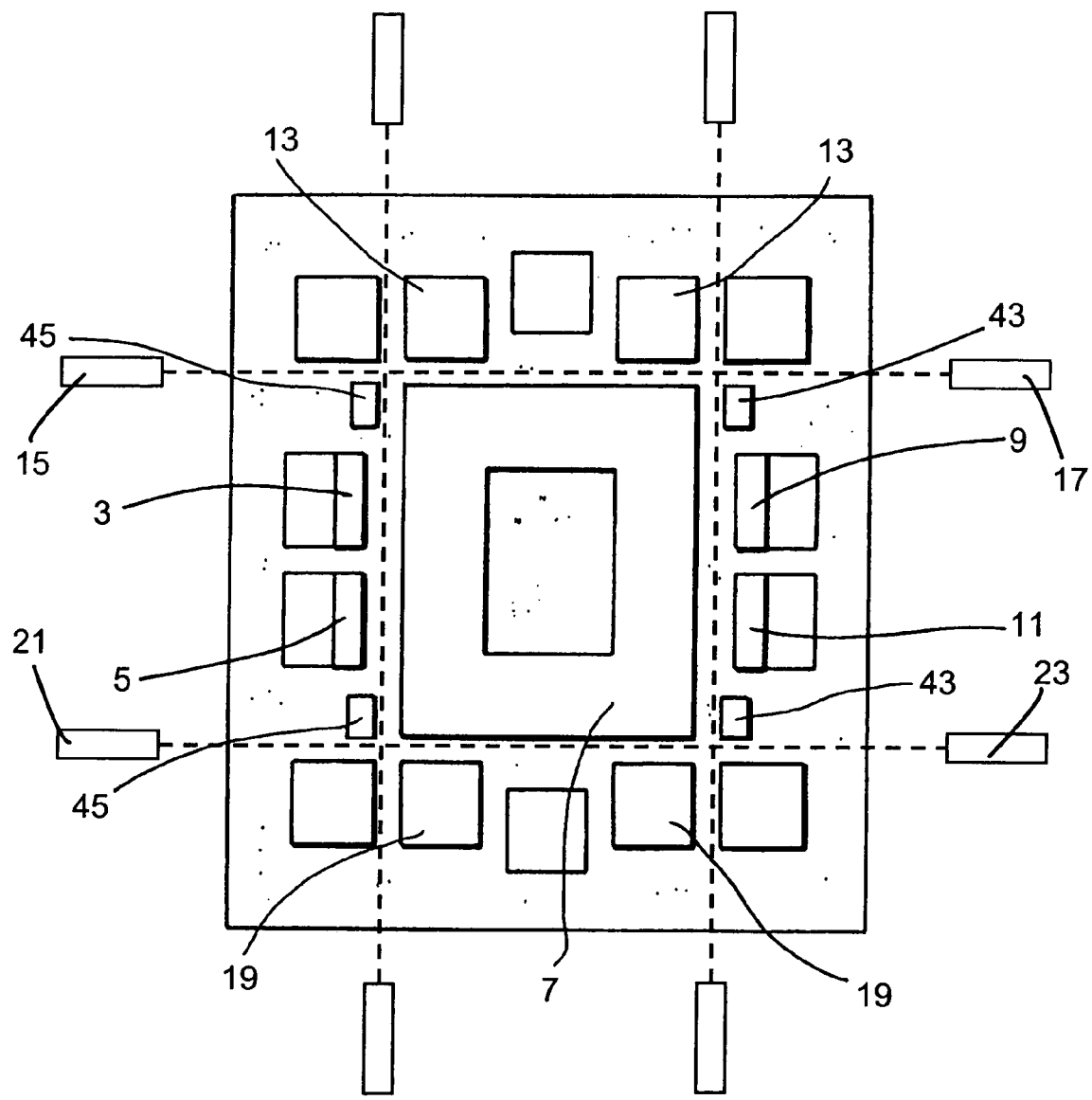
FIG. 20 is a plan view, uncovered, of an eighth embodiment of an electro-optical device according to the invention.

FIG. 20 illustrates a variant of the electro-optical device according to the invention, specifically designed for use as a detector of Coriolis forces (gyrostat). In this case one can note that the electro-optical device has a first condenser plate 3 and a fourth condenser plate 5 arranged on the left (in accordance with FIG. 20) of a conductive element 7, and a second condenser plate 9 and a third condenser plate 11 arranged on the right of the conductive element 7. The electro-optical device also has two first stops 13, in the upper part of FIG. 18, and two second stops 19 in the lower part of FIG. 18. The conductive element 7 moves in a zigzag fashion between the condenser plates thanks to voltages applied thereacross. If the electro-optical device is subjected to Coriolis forces the conductive element 7 will be moved laterally, i.e. upwards or downwards according to FIG. 15 (assuming that the rotational movement is perpendicular to the plane of drawing). In making contact with the first stops 13 (or the second stops 19) a light beam interruption signal will be obtained and, depending on the speed with which the zigzag movement is performed (and on the geometric parameters and the masses of the electro-optical device) the Coriolis force can be determined and, in consequence, the speed of rotation. The electro-optical device also has third stops 43 and fourth stops 45 which can be electric contacts or can be stops defining the cutting of two light beams being propagated from top to bottom in the drawing. Thus the limit of travel of each zigzag movement is detected by the control circuit of the electro-optical device. Alternatively, the position of the conductive element 7 can be determined by other procedures known to a person skilled in the art.

The invention claimed is:
1. A miniaturized electro-optical device comprising:
 a first zone facing a second zone,
 a first condenser plate arranged in said first zone,
 a second condenser plate arranged in said second zone and facing said first condenser plate, in which said second plate is smaller than or equal to said first condenser plate, an intermediate space arranged between said first zone and said second zone, a conductive element arranged in said intermediate space, said conductive element being mechanically independent from said first zone and second zone and being suitable for effecting a movement across said intermediate space from said first zone to said second zone and vice versa, depending on voltages present in said first and second condenser plates, a first inlet/outlet point of light from an optical circuit, a second inlet/outlet point of said optical circuit, arranged in such a way as to allow the passage of light therebetween, at least one first stop, where said conductive element is suitable for establishing contact with said first stop and where said conductive element modifies the state of passage of light between said first inlet/outlet point and said second inlet/outlet point when it is in contact with said first stop.

2. The electro-optical device of claim 1, wherein said first stop is arranged between said second zone and said conductive element.

3. The electro-optical device of claim 1, further comprising:
a third condenser plate arranged in said second zone, where said third condenser plate is smaller than or equal to said first condenser plate, and where said second and third condenser plates are, together, larger than said first condenser plate.

4. The electro-optical device of claim 1, further comprising:
a third condenser plate arranged in said second zone and a fourth condenser plate arranged in said first zone, where said first condenser plate and said second condenser plate are equal to each other, and said third condenser plate and said fourth condenser plate are equal to each other.

5. The electro-optical device of claim 4, wherein said first, second, third and fourth condenser plates are all equal to each other.

6. The electro-optical device of claim 4, further comprising:
a fifth condenser plate arranged in said first zone and a sixth condenser plate arranged in said second zone, where said fifth condenser plate and said sixth condenser plate are equal to each other.

7. The electro-optical device of claim 1, further comprising:
a second stop between said first zone and said conductive element.

8. The electro-optical device of claim 7, further comprising:
a third inlet/outlet point and a fourth inlet/outlet point arranged between said first zone and said conductive element such that said conductive element modifies the state of passage of light from a second optical circuit when in contact with said second stop.

9. The electro-optical device of claim 1, wherein each of assemblies of said condenser plates arranged in each of said first zone and second zone has a central symmetry relative to a centre of symmetry, where said center of symmetry is superimposed on center of masses of said conductive element.

10. The electro-optical device of claim 1, wherein assembly of said condenser plates arranged in each of said first zone and second zone has central asymmetry, thereby generating a moment of forces relative to the center of masses of said conductive element.

11. The electro-optical device of claim 1, wherein said conductive element has rounded external surfaces.

12. The electro-optical device of claim 11, wherein said conductive element is cylindrical.

13. The electro-optical device of claim 11, wherein said conductive element is spherical.

14. The electro-optical device of claim 1, wherein said conductive element has an upper face and a lower face, said upper and lower faces being perpendicular to said movement of said conductive element, and at least one side face, where said side face has slight protuberances.

15. The electro-optical device of claim 1, wherein said conductive element is hollow.

16. The electro-optical device of claim 1, wherein said first condenser plate has a surface area which is equal to or double the surface area of said second condenser plate.

17. Use of an electro-optical device according to claim 1, as an accelerometer.

18. Use of an electro-optical device according to claim 1, as a tiltmeter.

19. Use of an electro-optical device according to claim 1, as a detector of Coriolis forces.

20. Use of an electro-optical device according to claim 1, as a pressure sensor.

21. Use of an electro-optical device according to claim 1, as a microphone.

22. Use of an electro-optical device according to claim 1, as a flowrate sensor.

23. Use of an electro-optical device according to claim 1, as a temperature sensor.

24. Use of an electro-optical device according to claim 1, for acoustic applications.

25. Use of an electro-optical device according to claim 1, as a gas sensor.

26. Use of an electro-optical device according to claim 1, for the manufacture of an optical switching matrix.

27. Use of an electro-optical device according to claim 1, for projecting images.

* * * * *